United States Patent [19]

Davis et al.

[11] Patent Number: 4,887,221

[45] Date of Patent: Dec. 12, 1989

[54] COMPUTER CONTROLLED HONING MACHINE USING LOOK UP TABLE DATA FOR AUTOMATIC PROGRAMMING

[75] Inventors: James K. Davis, Fenton; Wayne W. Althen, St. Louis County; Daniel R. Cloutier, Clayton; Gerry R. Schnitzler, Oakville, all of Mo.

[73] Assignee: Sunnen Products Company, St. Louis, Mo.

[21] Appl. No.: 100,726

[22] Filed: Sep. 25, 1987

[51] Int. Cl.$^4$ ............................................. G06F 15/00
[52] U.S. Cl. .............................. 364/474.23; 364/191; 364/474.21; 364/474.24; 51/165.71
[58] Field of Search ................... 51/2 B, 165.71; 364/167–171, 188–193, 474, 475, 474.06, 474.23–474.27, 474.21, 167.01

[56] References Cited

U.S. PATENT DOCUMENTS

| | | | |
|---|---|---|---|
| 4,293,913 | 10/1981 | Nishimura et al. | 364/474 |
| 4,490,781 | 12/1984 | Kishi et al. | 364/191 |
| 4,498,259 | 2/1985 | Yamamoto et al. | 364/474 |
| 4,513,381 | 4/1985 | Houser, Jr. et al. | 364/174 |
| 4,521,860 | 6/1985 | Kanematsu et al. | 364/171 |
| 4,523,409 | 6/1985 | De Fazio | 364/474 |
| 4,530,046 | 7/1985 | Manekata | 364/171 |
| 4,590,573 | 5/1986 | Hahn | 364/171 |
| 4,603,392 | 7/1986 | Chikamoto et al. | 364/475 |
| 4,608,643 | 8/1986 | Breitenstein et al. | 364/474 |
| 4,631,870 | 12/1986 | Sun | 364/474 |
| 4,636,938 | 1/1987 | Broome | 364/171 |
| 4,648,025 | 3/1987 | Yoneda et al. | 364/474 |
| 4,709,509 | 12/1987 | Yoneda et al. | 364/474 |

Primary Examiner—Allen MacDonald
Attorney, Agent, or Firm—Haverstock, Garrett & Roberts

[57] ABSTRACT

A computer controlled machine tool such as a honing machine having a work engaging portion and apparatus to control the machine tool including to establish certain machine operating parameters based on the characteristics of the work to be done, including a computer device having an entry device for entering data as to the workpiece to be operated on, a computer storage device containing data pertaining to certain operating conditions and parameters, said computer device producing output data for establishing the operating parameters of the honing machine based on the entered data as to the workpiece, and the stored data, the computer device having outputs at which signals are produced for establishing the operating parameter for the machine tool.

24 Claims, 12 Drawing Sheets

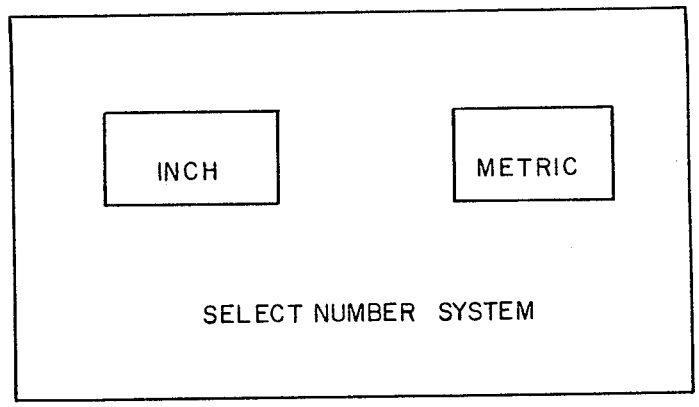
Fig. 7
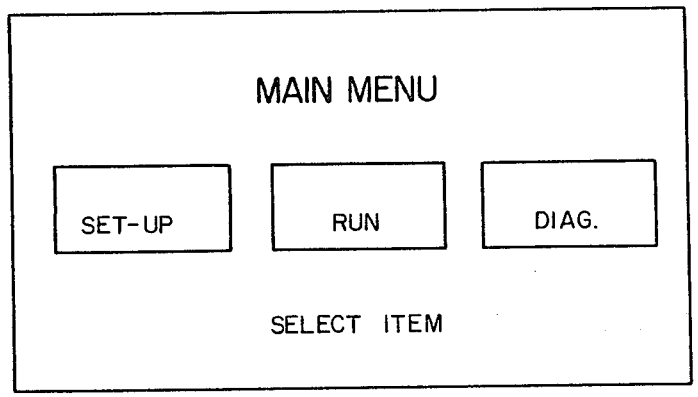
Fig. 8
| SET-UP MODE | | | | |
|---|---|---|---|---|
| Enter Start Diameter: | 7 | 8 | 9 | Main Menu |
| Enter Final Diameter: | 4 | 5 | 6 | Last |
| Enter Bore Length: | | | | |
| Enter Surface Finish: | 1 | 2 | 3 | DEL |
| Enter Crosshatch Angle: | 0 | . | ENTER | |
Fig. 9

SELECT MATERIAL TYPE

STEEL   CAST IRON   BRONZE

ALUMINUM   POWDER METAL   CERAMIC

*Fig. 10*

SET-UP MODE

BRINELL

| 90–120 | 121–150 | 151–180 | 181–210 | 211–240 |
|--------|---------|---------|---------|---------|
| 20–30  | 31–40   | 41–50   | 51–60   | 61–70   |

ROCKWELL C   ?

SELECT MATERIAL HARDNESS

*Fig. 11*

The Following Parameters Have Been Calculated

SPINDLE RPM _____

FINAL DIAMETER _____

STROKE LENGTH _____

STROKE RATE _____

FEED RATE _____

SAVE   EDIT

*Fig. 12*

INSTALL TOOL NUMBER _____

AFTER INSTALLATION PLACE WORKPIECE ON MANDREL
AND EXPAND MANDREL UNTIL IT IS IN CONTACT
WITH THE BORE.

PRESS ENTER WHEN COMPLETE.

ENTER

JOG STROKER TO ALIGN FRONT OF WORKPIECE BORE
WITH FRONT OF ABRASIVE ON MANDREL.

PRESS ENTER WHEN COMPLETE

ENTER

SELECT PARAMETER TO BE CHANGED:

SPINDLE RPM————
STROKE LENGTH————
STROKE RATE ————
FEED RATE ————
SPARK OUT TIME————
IN / METRIC ————

| SET-UP MODE | 7 | 8 | 9 | Main Menu |
|---|---|---|---|---|
| SPINDLE RPM = | 4 | 5 | 6 | Last |
| ENTER DESIRED SPINDLE RPM = | 1 | 2 | 3 | DEL |
|  | 0 | . | | ENTER |

| SET-UP MODE | 7 | 8 | 9 | Main Menu |
|---|---|---|---|---|
| STROKE LENGTH = | 4 | 5 | 6 | Last |
| ENTER DESIRED STROKE LENGTH = | 1 | 2 | 3 | DEL |
|  | 0 | . | | ENTER |

| SET-UP MODE | | | | |
|---|---|---|---|---|
| | 7 | 8 | 9 | Main Menu |
| STROKE RATE = | 4 | 5 | 6 | Last |
| ENTER DESIRED STROKE RATE = | 1 | 2 | 3 | DEL |
| | 0 | . | | ENTER |

Fig. 19

| SET-UP MODE | | | | |
|---|---|---|---|---|
| | 7 | 8 | 9 | Main Menu |
| FEED RATE = | 4 | 5 | 6 | Last |
| ENTER DESIRED FEED RATE = | 1 | 2 | 3 | DEL |
| | 0 | . | | ENTER |

Fig. 20

| SET-UP MODE | | | | |
|---|---|---|---|---|
| | 7 | 8 | 9 | Main Menu |
| SPARK-OUT TIME = | 4 | 5 | 6 | Last |
| ENTER DESIRED SPARK-OUT TIME = | 1 | 2 | 3 | DEL |
| | 0 | . | | ENTER |

Fig. 21

| SET-UP MODE | | 7 | 8 | 9 | Main Menu |
|---|---|---|---|---|---|
| IN/METRIC = | | 4 | 5 | 6 | Last |
| ENTER DESIRED IN/METRIC = | | 1 | 2 | 3 | DEL |
| | | 0 | . | ENTER | |

*Fig. 22*

| RUN MODE | |
|---|---|
| | ADJ. STROKE |
| CYCLE START | CLEAR COUNT / MAIN MENU |
| CYCLES COMPLETE = | TOOL COMP |

*Fig. 23*

ENTER TOOL OFFSET :

-Maxium Tool Offset = .0050 in.
-Offset Cannot Be Larger Than DIA. Expansion

| 7 | 8 | 9 | Run Menu |
|---|---|---|---|
| 4 | 5 | 6 | Last |
| + | 1 | 2 | 3 | DEL |
| − | 0 | . | ENTER |

COMPUTER CONTROLLED HONING MACHINE USING LOOK UP TABLE DATA FOR AUTOMATIC PROGRAMMING

BACKGROUND OF THE INVENTION

The present invention relates to means for setting up a honing process and more particularly, to improved means for establishing, setting and monitoring operating conditions for a honing machine from workpiece parameters and stored data.

There are in existance various devices for honing surfaces such as cylindrical surfaces and for the most part such devices are primarily mechanical devices which require considerable and constant operator attention and the quality of the work performed depends substantially upon the skill and experience of the operator. For example, an operator influences the honing process with known prior devices by, among other things, installing and removing parts to be honed, selecting a desired honing assembly or mandrel and setting in the desired honing stone travel, stroking motion and frequency, mandrel operating speed or RPM, the conditions for terminating a honing operation and in some cases the desired torque to be established and maintained to produce a desired stock removal rate taking into account the possibility for damage to the honing machine and to the stones and mandrels. The known devices therefore require considerable operator attention and experience during set up and during the honing operation. Other conditions must also be taken into account to properly set up and hone a workpiece. Such conditions include the selection of the machine components, the characteristics and hardness of work pieces to be honed, the amount of material to be removed, the type and size of mandrel to be used and its range of adjustment, the selection of a suitable abrasive material and related matters. The skill of the persons required for set up and for operating procedures and the amount of operator attention and experience required contribute substantially to the cost of honing and to the accuracy and uniformity of the parts produced.

Numerically controlled (NC) machine tools of various types have been used for many years and for many purposes. More recently computer numerically controlled (CNC) machine tools have also become widely used. Many of these devices have employed adaptive control means in the nature of a feedback control for changing certain machine parameters to compensate for changed conditions and to improve machine operation. NC and CNC machines generally require manufacturing and/or NC engineers to program into the machine the various machine parameters, and in the past this has often involved using handbook data and/or operator or programmer experience to make the machine perform the required functions on a specified workpiece. The data inputs thus produced are stored on punched tape, magnetic or non-volitile memories and related devices and are retained in a library for call up and use as required.

The current manufacturing environment is calling for ever smaller production lot sizes as industry moves toward Just-In-Time (JIT) manufacturing. Also, with today's rapidly changing technology, obsolescence of manufactured parts makes large lot sizes and therefore large inventories costly to maintain and generally undesireable. These and other factors place a heavy burden on manufacturing overhead especially in the areas of NC and CNC engineering support.

SUMMARY OF THE INVENTION

The present invention is designed to improve manufacturing productivity by teaching the construction and operation of a novel computer controlled precision hole sizing and finishing apparatus such as a honing apparatus which substantially reduces manufacturing overhead including machine set up and machine operation personnel requirements. This is made possible because the subject computer controlled machine does not require continual special programming efforts and handbook data or operator experience for every honing operation. More specifically, with the present device, some, if not most, of this information and data is included in or calculated by the machine software and programming. To this end the present construction simply requires entering data, sometimes referred to as blueprint data, relating to the workpiece, and the controls themselves establish from the workpiece parameters and stored data the machine operating parameters. The present device also does away with the need for libraries of programs for different jobs since these are replaced by the entry of data for each job and the program itself. However, it should be noted that a library of programs can be created with the present device, if desired.

The present invention enables a honing machine operator or set up man to rapidly input data as to each type of workpiece much of which data is readily available on working drawings or blueprints, directly into the interactive machine control. The control accepts such inputs including data as to desired finished bore diameter, starting bore diameter bore length, workpiece material, including material hardness, surface finish desired including cross hatch pattern, lot size and other information as well. When the workpiece parameters have been inputted, the computer will calculate the appropriate machine parameters and these will be displayed for the operator's review. The machine activities or functions are controlled by the computer and the calculated machine parameters establish operating parameters and associated machine control signals for the particular honing operation. These operating parameters and corresponding machine control signals are such things as spindle RPM, stroke rate, feed rate, stroke length, stroke position in the bore, and tool selection. The controls therefore interact with the operator inputted data, stored data and stored formulas and algorithms to establish certain machine parameters. The machine parameters include spindle RPM, stroke length and rate, feed rate, and overload protection data limits for each tool. The controls also provide a visual display for the operator as to various data including workpiece size, relative cutting torque, and the number of workpieces to be honed in a particular lot. The controls are so designed as to sense the cutting torque, which is a measure of the load on the mandrel and compare this with certain tool limits which are part of the function of the controls to warn the operator when necessary of impending problems caused by overloading or the like.

The machine controls, because of software programming, can determine the various machine parameters to be set using stored data such as data from stored look-up tables and calculations. This stored data and calculations performed by the computer can be used in much the same way that an NC programmer would use handbook data and his experience to arrive at certain machine parameters. Furthermore, with the present device the look-up tables and other information in the software can be modified and updated from time to time as new information becomes available. Thus a user or operator having updated software will always have the most up to date data including hole finishing data, and will not have to rely on engineers and others to program and reprogram the machine for each new job.

During operation of the machine, certain machine parameters will be monitored to maintain certain conditions and to make adjustments as required. This includes monitoring the position of the cone or wedge used to radially advance the abrasive members, the torque produced during the metal removal process in order to stop or abort the operation if the torque exceeds some safe level, the temperature of the workpiece and/or tool fixturing that holds the workpiece, and the data thus accumulated can be used to make adjustments of wedge position to compensate for thermal expansion. The data will also be used to compensate for time and displacement characteristics including the stroking characteristics of the stroking mechanism to maintain desired velocities of the sinusoidal or other time displacement curves and to compensate accordingly to maintain a relatively constant velocity of work surface being honed as in surface feet per minute. At the conclusion of a honing cycle, the position of the tool wedge can be and often is maintained fixed for a period of time that is long enough to relieve stresses induced in the workpiece during the honing operation. This part of the sequence is sometimes referred to as the "spark-out" portion. The final bore surface finish and geometry as to roundness, straightness and size control is achieved in this final step.

Providing a computer controlled honing machine in the manner described herein makes it possible to achieve consistancy and accuracy of workpieces produced including in large and small lot sizes, and this can be achieved automatically making all of the workpieces in each lot of desired size and surface characteristics thereby making the workpieces produced more uniform and more predictable as to size.

The present device uses a closed loop configuration to control and establish parameters of the honing process which gives the total process significant advantages over more conventional honing devices and processes which cannot adequately control and establish machine operating conditions from such a minimal number of inputs. Furthermore, the present construction in some situations can take into account changes that take place during the honing operation such as stonewear, wedge travel, temperature and other similar affects all of which tend to limit or modify stock removal rates including stock removal rates per stroke. This is especially important when the machine is operating at a fixed diameter setting for a tool such as a tool having a work surface formed of a super abrasive material. Diamond reaming and single pass through honing operations which are in wide use have some advantages in this regard but they do not provide as broad an operating range as is possible with the present construction, and with single pass through devices the tool is engaged with the work for a very short time and often little or no multiple stroking takes place. The present construction offers means for overcoming this and other limitations of the prior art, and the present improvements can be applied to many more kinds of machines including those that use super abrasives such as abrasives that include diamond particles, particles of cubic boron nitride or like substances. The present construction is also especially adaptable for use in multistroke honing applications which are able to accomplish the same high accuracies that are achieved by single pass through honing while at the same time providing a relatively wider range of honing diameters per tool, and stock removal rates that are not available from a single pass through honing machine and honing by more conventional honing devices including those that use vitrified abrasives.

It is a principle object of the present invention to provide a computer controlled honing machine which can be accurately preset taking into account a number of different operational and environmental conditons and parameters and which enables the production of more consistant accurately sized work surfaces and with minimal operator attention, knowledge and experience.

Another object is to make it economically feasible to accurately hone relatively small lots of workpieces.

Another object is to greatly simplify and facilitate machine set up procedures and without requiring a library of programs including a program for each different workpiece to be honed and without requiring set up data for each different job stored on punched tape, magnetic media or other non-volital memory devices or other like storage devices.

Another object is to minimize operator influence on a honing operation and thereby increase accuracy of honed workpieces.

Another object is to substantially increase the operating range of honing mandrels with respect to known constructions of single-pass superabrasive tools.

Another object is to greatly reduce or eliminate the need for manufacturing and NC engineers in the development of set up procedures and data to control specific honing operations for particular workpieces including also the elimination of the need for look up handbooks and other data sources for the operator to refer to, all of which can be now included in the software or other storage means associated with a honing or like machine.

Another object is to teach the construction and operation of a computer controlled honing machine which can be made to operate with many different types of honing mandrels having a relatively wide as well as very narrow ranges of honing diameter adjustability.

Another object is to make possible the better monitoring of super abrasives in stroking type honing machines thereby increasing the operating ranges therefor.

Another object is to make honing easier to program and control and safer to operate.

Another object is to reduce the need for single pass through honing operations to achieve accuracy and uniformity of workpiece size and to overcome the deficiency of single pass honing tools with regards to limited material removal capacity by increasing the expansion capability of the operation.

Another object is to change the nature of the skills and the training required by persons operating honing machines.

Another object is to provide means for automatically controlling and compensating for more of the operating functions and machine adjustments in a honing operation including the selection of spindle RPM, stroke rate, feed rate, stroke length, stroke position, tool selection and temperature compensation.

Another object is to give the operator of a honing machine wider options as to the selection of tooling and operating parameters.

Another object is to allow for implementation of the present system to an automated manufacturing (DNC or CAM) environment.

Another object is to enable the operator of a computer controlled machine to optimize the operating conditions including also the possibility of overriding machine established parameters.

These and other objects and advantages of the present invention will become apparent to those skilled in the art after considering the following detailed specification of a preferred embodiment in conjunction with the accompanying drawings.

DESCRIPTION OF THE DRAWINGS

FIGS. 7–22 show some of the set up screens that appear on the monitor of the computer portion of the controls for the present honing machine; and FIGS. 23–25 show typical screens that appear during the run mode of the machine.

DETAILED DESCRIPTION OF THE PREFERRED EMBODIMENT

The present invention relates to a novel computer controlled honing machine which establishes machine operating parameters from input data related to workpiece parameters and stored data. Because computer generated operating parameters control the setting up of the parameters for a honing operation in the present invention, the honing machine operation produces more uniform and more accurately honed work surfaces with a much greater range of honing diameter adjustablility (especially when compared to single pass honing) during a honing operation. Also, in the past, experience and skill of the operator played a major roll in the quality, accuracy and uniformity of the finished product. The present means rely much less, if at all, on the skill and experience of the operator.

The honing machine portion of the present device may include many of the features and components of known honing machines such, for example, as use of known honing mandrels, known mandrel stroking means, known means for radially advancing and retracting the work engaging members, and known abrasives including especially super abrasive materials which are super hard abrasive particles such as diamond particles, particles of cubic boron nitride, and other super hard materials.

Many of the operating conditions encountered during honing were not taken into account in known devices other than by relying on the skill and experience of the operator. These include such things as workpiece variations due to temperature changes, variations in machine torque, changes produced by the selection of a desired abrasive, wear of the machine components including the stone advancing means and the stones or other abrasive, the presence or absense of stroking, and the nature including the hardness and wearability of the member to be honed. There has been no way to accurately and predictably take all of these and other variables into account and to make appropriate adjustments to compensate for changes therein including the possibility for making accurate changes during honing machine operation, and this has resulted in some variation and inaccuracy from workpiece-to-workpiece.

The present invention represents the first known attempt to computerize a honing machine by means which provide simplified set up procedures and also allows an operator to take into account changes and variations which may occur during a honing operation so that in some cases, adjustments can be made to compensate therefor. With the present construction all that generally is necessary is for the operator to enter a few items normally readily available on a blueprint or other data source, and the computer will use these entries to establish all of the necessary operation conditions and parameters and little or nothing further is normally required of the operator. No known device has these capabilities.

Figure 1:
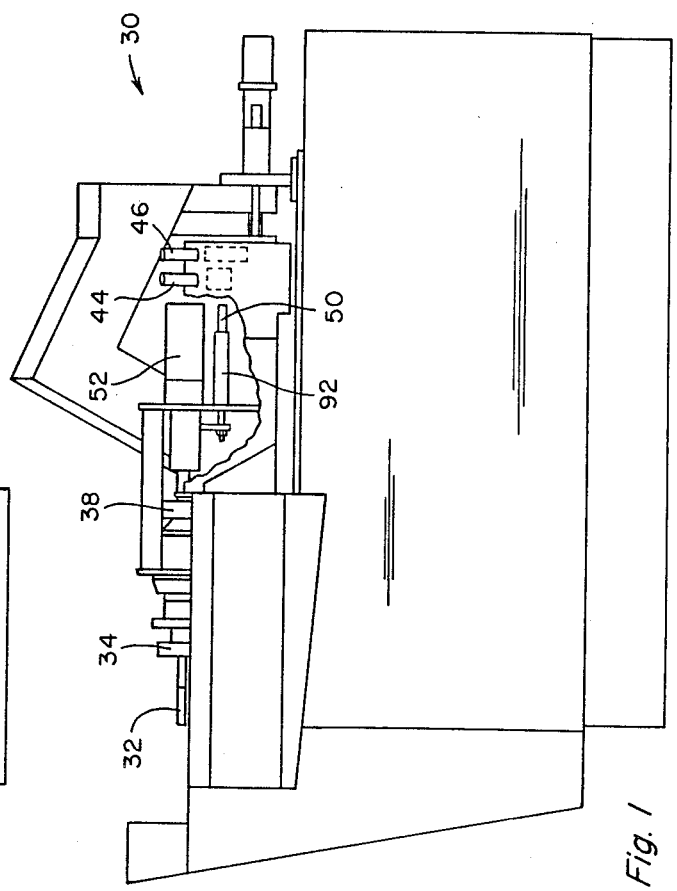
FIG. 1 is a plan side view of a computer controlled honing machine showing the locations of various machine components and sensors associated therewith for use in monitoring machine conditions.

The honing machine 30 shown in FIG. 1 is illustrative of many different kinds of such machines including vertically and horizontally oriented honing machines that can be computerized as set forth herein. The horizontal honing machine shown is for illustrative purposes. The honing machine 30 includes a mandrel assembly 32 mounted in a spindle adapter assembly 34 sometimes referred to as a spindle nose which is driven either through gearing or belting by a drive motor 36 which is shown in the drawing as having its axis offset relative to the axis of the mandrel assembly 32 to accommodate the drive belt 38.

Figure 3:
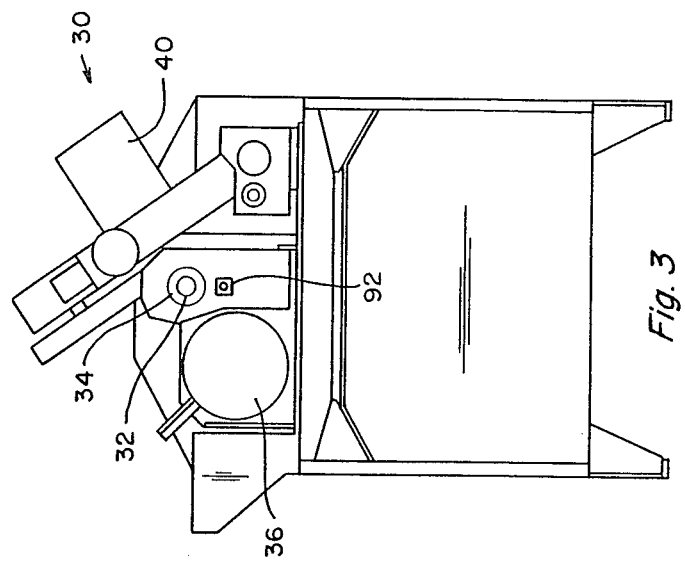
FIG. 3 is a right end view of the computer controlled honing machine shown in FIG. 1.
Figure 2:
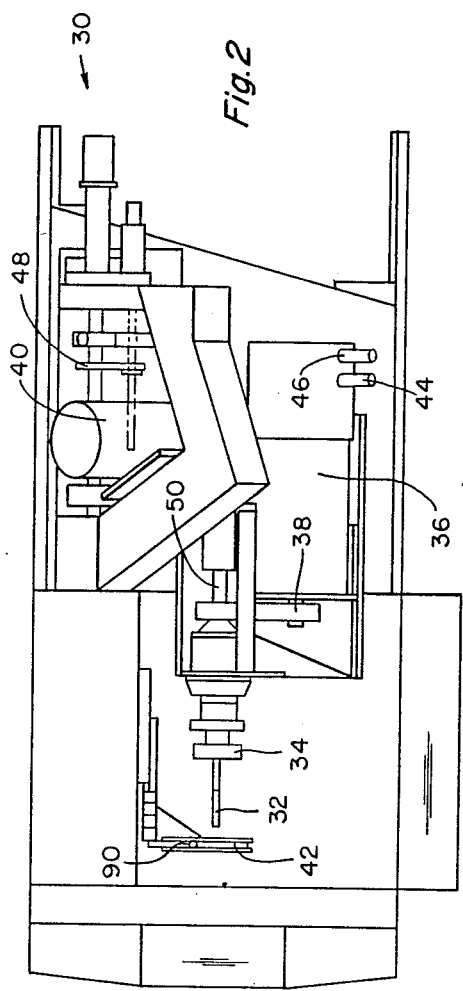
FIG. 2 is a top view of the computer controlled honing machine shown in FIG. 1.

In FIGS. 1–3 the workpiece or workpiece support fixture 42 is shown having a stroking motion imparted thereto by stroking means 40, and that workpiece may be supported by the support fixture 42 on the machine 30. It is contemplated that the present invention applies also to machines which stroke the mandrel assembly while maintaining the workpiece in a fixed axial orientation and both types of stroking mechanisms are common to the honing industry.

The mandrel assembly 32 is rotated by the drive motor 36 through the belt 38 and the drive motor 36 is shown having first sensor means 44 thereon for sensing spindle RPM and second sensor means 46 for sensing the spindle load or torque. Various known RPM and torque sensing devices can be used for this purpose and the sensors can be mounted on the motor 36 as shown or they can be mounted on or in association with the spindle 32 itself. The use of sensors for these purposes is not new and the location and type of sensor employed is at the discretion of the machine manufacturer. The stroking means 40 has its own stroke position sensor 48 which produces an output which varies with the position of the stroking means relative to the mandrel 32. When stroking the mandrel, the sensor output varies with the position of the mandrel relative to the workpiece or its holding means.

During a honing operation a feed rod or wedge 50 is moved in the mandrel assembly 32 to radially enlarge or expand the honing diameter and to retract the mandrel. One of the important advantages of the present construction over prior art constructions such as single pass through devices is that the present construction includes a feed rod or wedge assembly which moves in the mandrel to increase the diameter of the mandrel 32 during a honing operation. This is done as stock is removed from the workpiece in order to maintain the abrasive member engaged with the workpiece under pressure until the desired final diameter has been reached. With known single pass through devices it has not been possible to change the honing diameter during a honing operation but only to preset the honing diameter prior to the honing operation to establish the desired stock removal. For this reason known single pass through mandrels, and especially those that use super abrasives, have been tapered over most of their length to control the amount of material that can be removed from the workpiece to establish a desired diameter and work surface smoothness. No adjustment of the honing diameter is possible during honing when using single pass through honing devices, and this has greatly limited their usefulness and substantially reduced the amount of stock that can be removed from a work surface. Multiple stroking was also not ordinarily used. The tooling necessary to achieve expansion or increases in the honing diameter during a honing operation is covered by co-pending Schimweg et al U.S. Pat. Application Ser. No. 102,658, filed Sept. 30, 1987, assigned to Applicants' assignee.

With the present computer controlled honing machine it is possible to enter data such as blueprint or other data into a computer entry means such as by means of a keyboard 54 (FIG. 4) or other entry devices such as touch sensitive CRT screens while set up screens appear on the monitor 55. When this is completed the computer calculates from the simple data inputs, stored lookup tables, formulas, and algorithms all of the parameters and operating conditions necessary to perform the desired honing operation including information as to the wedge travel necessary for expanding the mandrel, the final position of the wedge when the honing operation is completed and during spark-out, and the desired stroking pattern information and settings required based on the dimensions of the workpiece to be honed. The machine will also evaluate the condition of torque and calculate spindle RPM required to perform the desired honing operation, the selection of the desired tooling including the range of diameters covered by the tooling and the kind of abrasives involved, and it is also possible by using the temperature sensing means which preferably sense the temperature of the workpiece as distinguished from the workpiece holder or fixture, to compensate for apparent inaccuracies in the honing due to the temperature increases that occur in the workpiece during the honing operation. Thus, unlike all known devices, the present device is able to receive certain initial information from which all of the various machine conditions and parameters are established so that the machine operator does not need to make any guesses or estimates based on experience or otherwise nor does the operator need to rely on handbook data which is included in the software for the present machine, and as indicated, can be updated from time to time as new information is made available.

Figure 4:
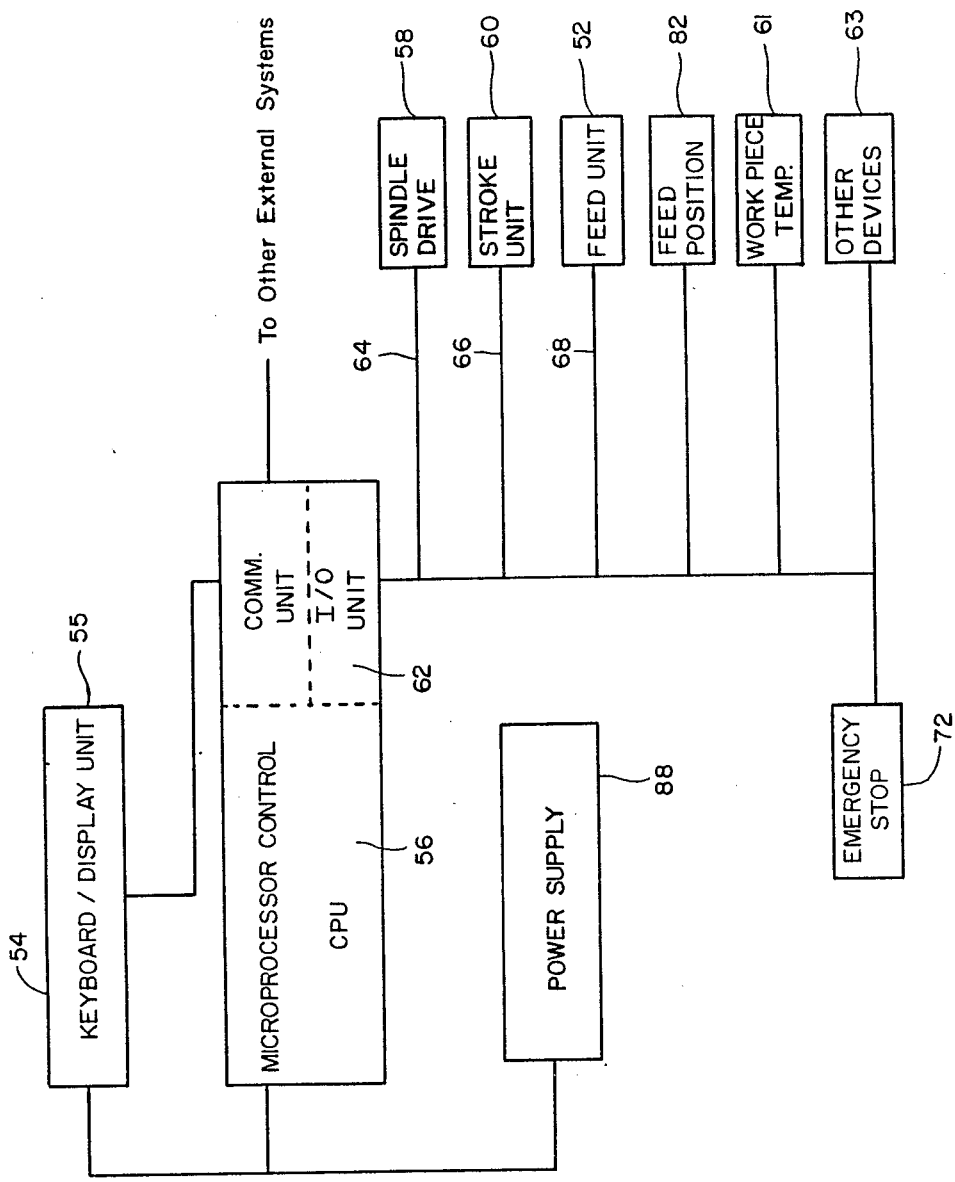
FIG. 4 is a block diagram of the circuit for the subject computer controlled honing machine.

FIG. 4 is a block diagram of the circuits for a computer controlled honing machine 30 constructed according to the present invention. As shown in FIG. 4, the circuit includes a keyboard/display unit 54 which may be of conventional construction including having a keyboard for entering data and controls and a display 55. Or alternatively the keyboard may be in the form of preprogrammed touch screen blocks which the operator touches to make entries of the necessary data. The keyboard/display unit 54 is connected to a microprocessor or other computer device 56 which is the main control for the subject machine. The microprocessor 56 may be a commerical type of computer such as a microcomputer utilizing a standard operating system modified and/or programmed to satisfy the various conditions and parameters outlined in this specification or it may be a dedicated microprocessor with a customized operating system. However whichever system is used it should be compatable with communication protocols commonly in use in the DNC or CAM environment. The microprocessor 56 has connections to various controls and sensors in the honing machine including a connection to the spindle drive 58, connections to the stroking unit 60, connections to the feed unit 52, connections to a workpiece temperature unit 61, connections to other devices 63, and connections to the principal sensors required including the sensor 44 which senses spindle RPM, the sensor 46 which responds to the spindle load or torque, the sensor 48 which responds to the position of the stroke mechanism in its stroking operation, the sensor 92 which responds to the feed wedge position, and the sensor 90 which responds to the temperature of the workpiece or workpiece holding means. In connection with the stroke sensor 48, it should be noted that during a typical honing operation it will be necessary to locate the mandrel assembly 32 or the stroke arm or fixture 42 in a particular initial position in its stroke so that during the stroking the position of the mandrel assembly 32 will move over a desired axial range to produce the actual honing operation.

The microprocessor 56 also is connected to an I/0 unit 62 which has various output connections that are used to control different elements in the honing machine in order to establish the desired operating conditions. The output signals include a spindle enable connection 64, a stroker enable control connection 66, a feed unit enable connection 68 and other connections such as a feed unit direction control connection. Various other output lines are available and could be used to control other machine functions. The I/0 unit 62 includes a communication section for connecting the keyboard display or other entry means and various other external devices such as a post gaging unit, automatic loading device, and other dedicated control panel devices. For example, an emergency E-stop line 72 allows the operator to stop the machine in an emergency situation. A jog feed advance line 74 and jog feed retract control located on the machine provide that an operator may manually energize the feed unit for expansion and retraction of the honing tool. Jog stroke controls allow the operator to manually jog a stroke mechanism for movement of the stroke in either direction respectively at a desired rate. A feed home control may also be provided so that an operator may manually enable and set a reference position from which to determine the feed unit position. When this control is activated, the feed unit position is set to zero. The same control can also be used to limit feed retraction of the feed unit when in a manual mode. A feed advance control is used when it is desired to activate a limit switch which limits advancement of the feed unit when in a manual mode and this control provides a signal which will go high or to a logical "1" when the spindle drive is in a ready state and a no fault condition exists.

The circuit for the subject computer controlled honing machine also includes a suitable power supply 88 which may be of conventional construction and produces appropriate output voltage levels to establish the operating conditions necessary for the various elements.

It is thus possible with the present construction to bring the machine to its initial operating conditions by simply entering workpiece data, after which the machine can perform a honing operation when a workpiece is in proper position. The honing operation will take place during which the mandrel will be expanded from its initial operating diameter which is the condition where it just comes in contact with the work surface to a final condition where it has been expanded until the final desired diameter of the finished work surface has been reached. The final condition may actually be somewhat different from the desired final diameter taking into account the fact that as the honing takes place the workpiece will heat up and the diameter of the work surface will change accordingly so that this must be taken into account. The final diameter honed will therefore usually be somewhat different from the desired final diameter achieved after the workpiece has cooled.

It may be necessary from time to time to test a workpiece after it has been honed and cooled to make adjustments to compensate for variation or wear in the mandrel or the work engaging surface on the mandrel. This can be done using conventional gaging devices to measure the size of the work surface. Usually this is done a time or two in typical honing operations such, for example, after the first and some subsequent workpieces have been honed, and the rest of the honing using the same mandrel can usually be completed without making any further changes, tests or adjustments. If an electronic gaging device is used its outputs can be fed into the computer so that the computer can make the necessary calculations and corrections.

Referring again to FIG. 1 which shows certain mechanical details and features of a honing machine 30 in outline form for ease of understanding, it can be seen that these include spindle drive means 36 for rotating a honing mandrel 32, stroking means 40 for axially moving the mandrel 32 and/or the workpiece relative to one another during the honing operation, means 52 for axially advancing or retracting a wedge relative to the mandrel 32 to radially expand or retract a work engaging member, and fixturing 42 for supporting, and in some cases stroking the workpiece while it is being honed. The honing machine 30 also includes the associated computer means (FIG. 4) which can be programmed to establish the desired operating conditions and parameters sometimes referred to as the "SET-UP" procedures.

The machine 30 has various sensors or transducers located to sense certain parameters and conditions of the machine as stated. These include the temperature sensor 90 shown located to engage the workpiece or the workpiece fixturing 42 for responding to workpiece and/or workpiece fixturing temperature, the sensor 44 located on or in association with the spindle drive 36 to respond to spindle RPM, the sensor 46 on the spindle drive 36 for responding to spindle torque or load, the sensor 48 on or in association with the stroking mechanism 40 to respond to instantaneous stroke position, and the sensor 92 in the feed up means for the wedge 50 to respond to instantaneous wedge position.

The controls for the subject machine 30 also include the keyboard 54 or like means for entering information and data especially during the set up mode and for controlling other computer functions. This can include information as to workpiece bore starting diameter, finished bore diameter, bore length, workpiece material including the hardness thereof and the desired surface finish and crosshatch angle when known. The computer program contains lookup table data and other data as well, and from the data entered by the operator, the controls will be able to automatically calculate such things as spindle RPM, stroke length including overstroke length, strokes per minute or stroke frequency, the surface feet of honing to take place per minute, a recommended stock removal rate and a cycle time to complete a honing operation. Other information will also need to be entered such as the number of workpieces to be honed.

Thereafter during the honing process a monitor run screen will be generated on the monitor to indicate various operation conditions. These will include an ongoing indication of the number of workpieces or honing operations completed, the number of workpieces remaining to be honed, the temperature of the workpieces, the number of workpieces being honed per unit of time such as per minute, and the stock removal rate being used. The control also has provision for indicating and, if necessary, overriding certain operation conditions to make changes therein such as in the spindle RPM, the stroke length, stroke position, stroke rate, final feed wedge position and stock removal rate. The run screen also provides indications of instantaneous torque and wedge position. The torque may vary over a relatively wide range from conditions with little or no torque to substantial, even excessive operating torques. The position of the wedge can be followed from its initial condition at the beginning of the operation when the honing member just comes in contact with the work to its condition when the desired final bore size is reached. The actual wedge movement can be monitored on a horizontal scale that appears on the run screen with indications on the scale band based on entered data to indicate the initial and final wedge positions. Typically the scale band image appearing on the display will represent the total tool expansion range.

Figure 5A:
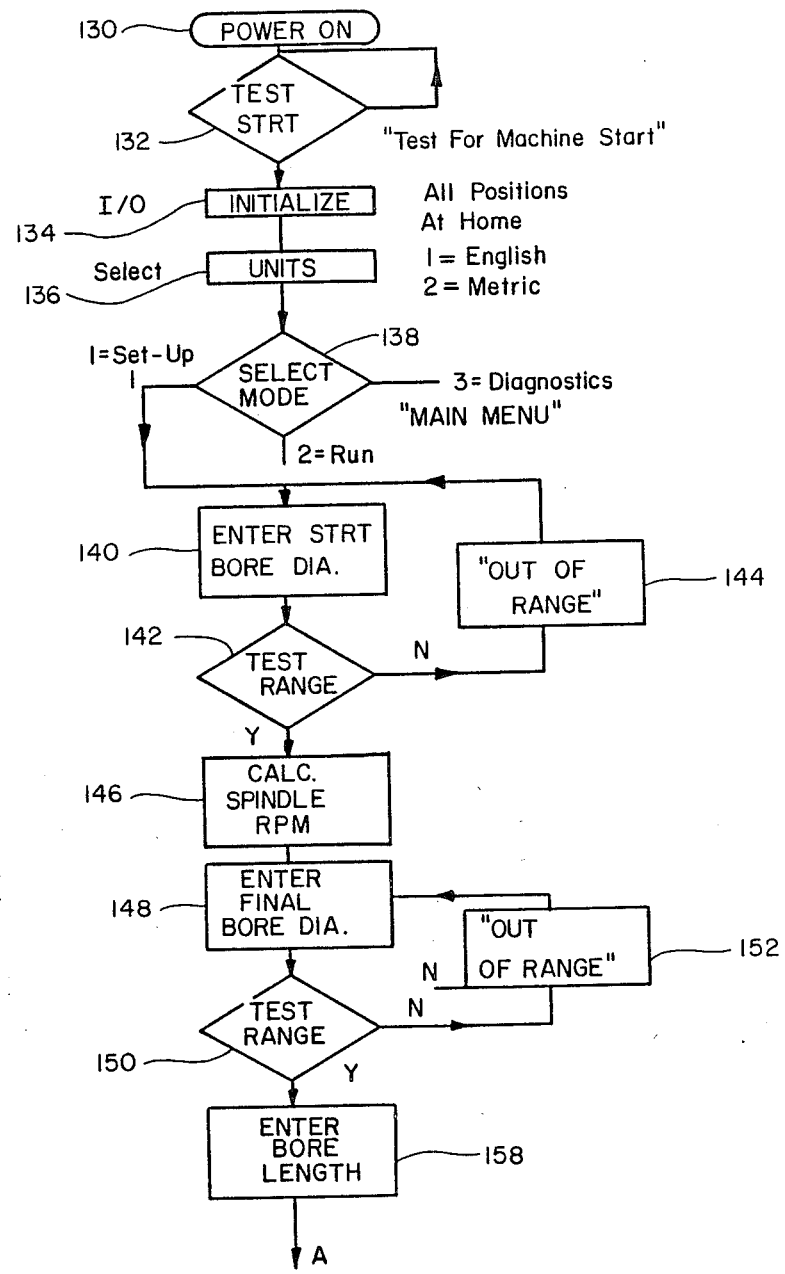
FIG. 5A and 5B together form a flow chart for the set up mode employed in the present computer controlled honing machine.
Figure 5B:
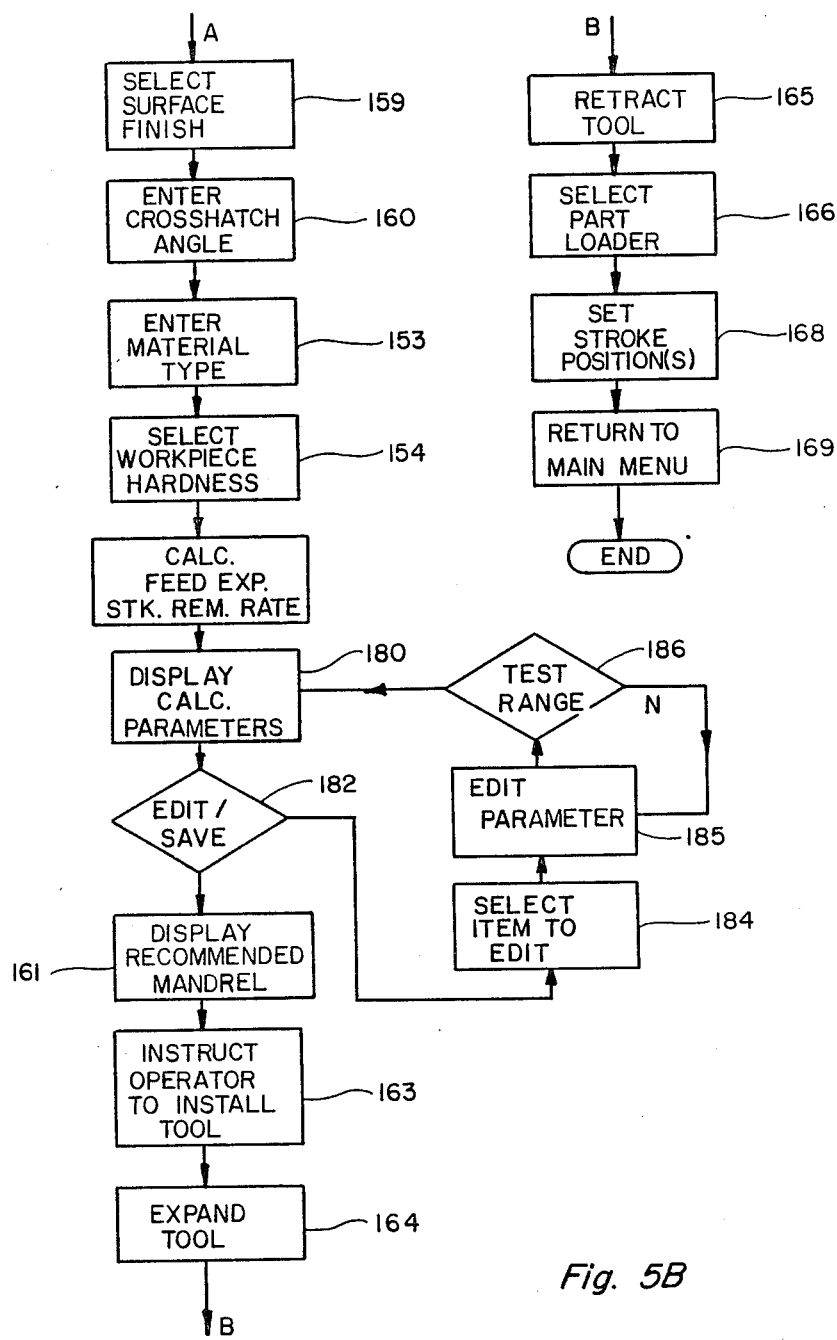

The set up flow chart shown in FIGS. 5A and 5B begins with a power on block 130 which establishes a test start condition or pattern 132 which in turn controls an initializing step 134 in which many of the machine operating conditions are returned to their home conditions. One of the first things that occurs is to enable the operator to select between the use of English and metric measures which occurs in in/metric block 136. The in/metric block 136 provides means to enable the select mode 138, which mode provides the operator with 3 options, namely the set-up option, the run option, and the diagnostics option. The select mode block therefore represents the main menu for the machine. The set-up mode is illustrated in FIGS. 5A and 5B and must be selected to be operative.

In the set-up mode a screen is produced with the legend "enter start bore diameter" 140. The operator enters the start diameter of the workpiece bore to be honed, and this block on the flow chart controls test range block 142 which can produce either an "out of range" indication, block 144, or enables activating a "calculate spindle RPM" block 146 whereby the spindle RPM is calculated. Selection of the block 146 activates block 148 labeled "enter final bore diameter" which the operator now enters. This entry also is tested at test range block 150 which either indicates "out of range" condition, control 152, or if the initial and final diameters entered are both in range, goes to "enter bore length" in block 158. This enables the next screen which asks for desired surface finish, block 159, and crosshatch angle, block 160. The next step is to go to the "enter material" block 153. A screen appears showing the range of hardnesses, block 154, associated with the selected workpiece material, highlighting the typical hardness for the material and solicits hardness input. The next block 180 labeled "display calculated parameters" will occur. The block 180 has associated with it a save or edit block 182 which can be used to save or edit the various parameters that have been determined by the control. The entry of the revised parameters is controlled by actuation "select items to edit" block 184 which is associated with an edit parameter block 185 and with a test range block 186, the "display calculated parameters" block 180, and the save or edit block 182, going through this loop until the operator chooses the save option in block 182. At this time the parameters are saved in the control memory according to the save parameter block 182. The recommended tool, block 161, is displayed on the screen, and the instruction is given to install the mandrel in the machine, block 163. Further display instructs that a workpiece is to be placed on the mandrel, the abrasive member expand, block 164 and the resulting wedge position entered into the control. This establishes the initial wedge position. The tool retract block 165 retracts the tool to the initial wedge position. If an auto workpiece loader is available, then "select part loader" will be activated, block 166.

Another block 168 labeled "set stroke position" is provided to enable the operator to establish the position for the stroking. A jog control on the machine is also provided in association with the block 168 which control enables the operator to jog the stroke position one way or the other as required to establish the position of the stroking relative to the bore.

Figure 6:
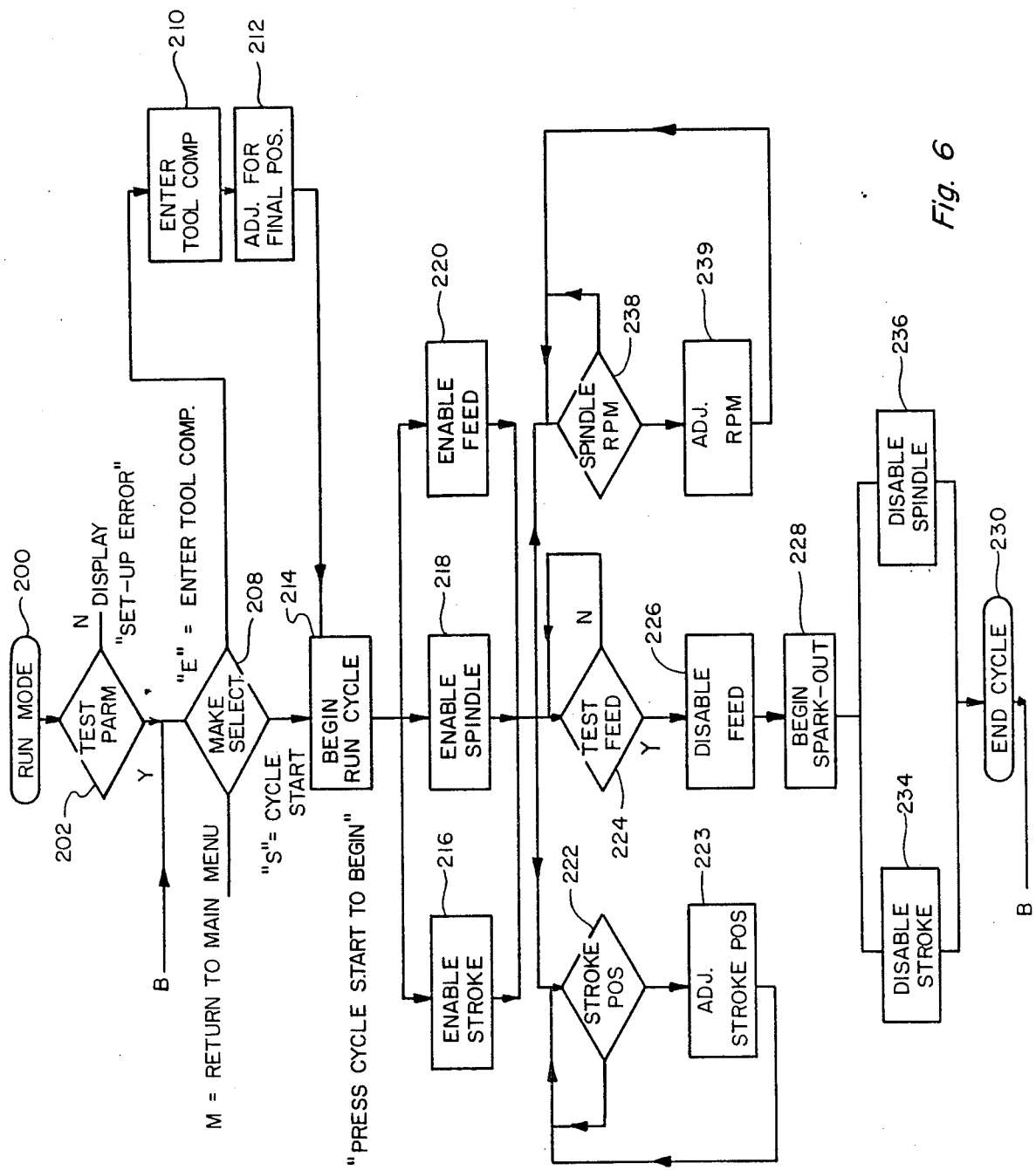
FIG. 6 is a flow chart for the run mode of the same machine.

Following the stroke control block 168 may be an optional "enter dwell time" control which enables the operator to establish dwell time during the stroking if this feature is available in the machine stroking system. Being able to adjust the dwell times is important in some applications because it enables the operator to produce pauses or dwells in the stroking so that greater honing can take place at certain places than at others. Conversely, the shorter the dwell times the less honing will take place at the point of dwell. The control then returns to main menu through a block 169 labeled "return to the main menu". When the control is returned to the main menu the operator has the opportunity to reselect the set-up procedure described above or select the run or the diagnostics mode. If he selects the run mode he will initiate the procedures covered by the flow chart shown in FIG. 6.

The run mode has an entry block 200 associated with a test parameter block 202 capable of producing a display labeled "set-up error" or of proceding to a block 208 labeled "make select" which gives the operator the options of again returning to the main menu or to enter tool comp 210 or produce a start cycle to cause the run cycle for the machine to be initiated. If "enter tool comp" is selected, a block 212 labeled "adjust for final pos" will appear to enable the operator to establish a new final position for the wedge as sensed by the position sensor 92.

If cycle start is selected, a block 214 labeled "begin run cycle" will take over to start the honing operation. This will enable the stroke mechanism 40 under control of a block 216 labeled "enable stroke" and also enable the spindle mechanism under control of a block 218, and the feeding up mechanism 52 including the wedge 50 under control of a block 220 labeled "enable feed". The blocks 216, 218, and 220 are all simultaneously enabled to cause the rotational and stroking motion of the spindle to take place. The feeding of the wedge to increase the honing diameter will also occur to cause honing to take place. During the honing operation the stroke position is sensed by the stroke position sensor 48, the feed up is sensed by the wedge sensor 92, the spindle RPM is sensed by the RPM sensor 44, and spindle torque is sensed by sensor 46.

Referring again to FIG. 6, a block 222 and associated block 223, are labeled "add stroke pos" provided for stroke position and adjustment. Another block 238 in the flow chart labeled "spindle RPM" is associated with a spindle motor tachometer block 239 labeled "adjust RPM output". This control provides means to respond to the spindle RPM so that adjustments can be made in the RPM setting as required. Yet another block 224 labeled "test feed" is associated with a "disable feed" block 226 which is further associated with the spark-out cycle block 228. Operation of these controls will terminate an operating cycle. The "end cycle" condition is indicated on the flow chart by block 230 which is downstream from blocks 234 and 236 labeled disable stroke and disable spindle.

FIGS. 7-25 are displays which appear during machine set-up and operation. The entry means is of a touch sensitive screen but it is contemplated that a keyboard or other suitable entry means may be employed.

FIG. 7 shows an electronic display that appears after the machine is initialized for startup. At this point the system of units is selected. FIG. 8 is displayed after the system of units are chosen. At this point the set-up, run, or diagnostics mode is selected.

Selection of the set-up mode results in the display of FIG. 9. The screen has the legends:
"Enter start diameter"
"Enter final diameter"
"Enter bore length"
"Enter surface finish"
"Enter crosshatch angle"
Each includes an associated control entry space. The user can now enter each of these parameters through the entry means such as the touch sensitive keypad unit shown. Upon completion of the last entry FIG. 10 is displayed.

FIG. 10 displays six typical materials to be honed. The range of materials that can be honed, however, is not limited by this set-up screen and it is contemplated that various other materials could also be honed in which case an override is provided to make the appropriate entries.

Once the material is selected FIG. 11 is displayed. The user selects the hardness of the workpiece material from the ranges given. If the material hardness is unknown to the user the "?" may be selected and the computer will default to a typical hardness value for the workpiece material type selected.

After the hardness value is selected, FIG. 12 is displayed. The parameters shown, are either calculated, found in look-up tables, or inputted by the user. It is contemplated that other parameters may be displayed on this screen in addition to those shown, such as spark-out time. The operator may choose to save or edit these parameters after review. Upon selection of the "Save" options, the machine executes the setting of these parameters. It is important to the present invention that most of the machine parameters are calculated without the operator having to do anything but make the initial entries. Furthermore, once the machine has made its calculations the computer, not the operator, sets up the machine to do the job. No known device has such capabilities. Thus the present computer control means do most of the things that were once required of the operator, and it does so expeditiously and accurately.

Figures 13, 14, 15:
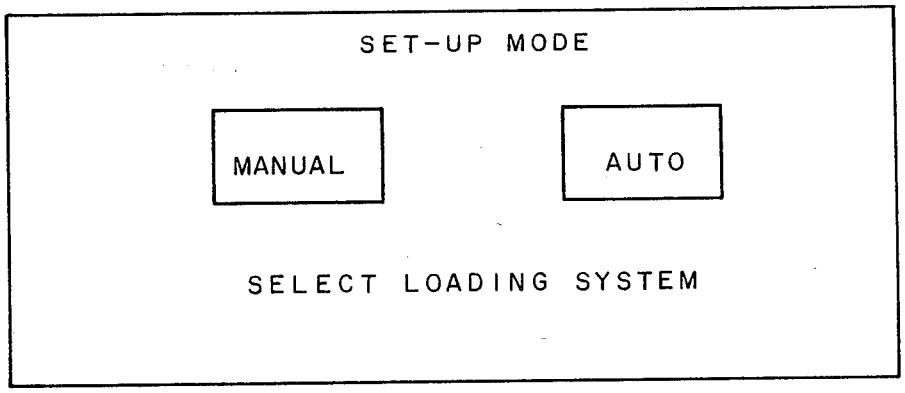

FIG. 13 is displayed after the "Save" option is chosen. The operator is prompted to place the tool displayed in the spindle assembly. The operator is also prompted to place a workpiece on the tool and to jog the wedge to expand the tool abrasive surface until contact is made with the workpiece bore.

FIG. 14 is displayed after the wedge has been jogged to the initial wedge position. This display allows the operator to choose between manually loaded workpieces or an automatically loaded workpiece system if such a feature has been installed on the machine. See copending Vanderwal et al U.S. Pat. application Ser. No. 098,549, filed Sept. 21, 1987 assigned to Applicant' assignee.

FIG. 15 is displayed to allow the set-up of the stroke position. The operator is prompted to align the front of the workpiece bore with the front of the abrasive element on the tool. The microprocessor can calculated stroke position from this reference point. The display returns to the main menu shown in FIG. 8 after this entry is made.

Figures 16, 17, 18:
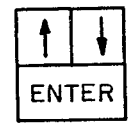

FIG. 16 is displayed if the "Edit" mode from FIG. 12 was chosen instead of the "Save" mode. The display shows some of the calculated parameters which can then be edited by the operator. If the operator chooses to edit a parameter, the associated edit screens shown in FIGS. 17-22 appear on the display unit. Changes are allowed through the number keypad shown on these screens within certain safe operating limits. After the desired edits are made the display returns to FIG. 12 to allow the operator to save the changes or make additional changes.

After set-up is complete the display returns to the main menu shown in FIG. 8. The run mode is selected and FIG. 23 is displayed. Selection of the "Cycle Start" initiates a honing cycle. The operator may also make minor adjustments to the machine parameters from this display such as stroke adjustment and tool compensation. This is necessary so that the operator can make suitable adjustments to compensate for tool wear and for other conditions that might produce inaccuracies.

Figures 24, 25:
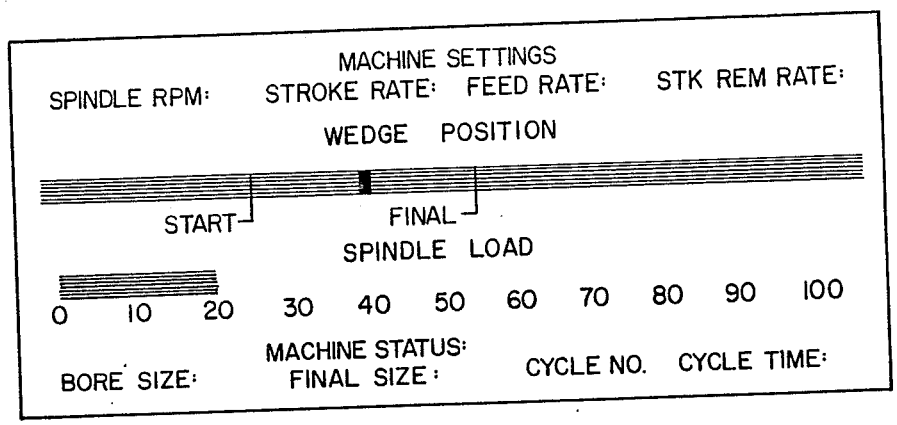

FIG. 24 is displayed after the selection of "Cycle Start" shown in FIG. 23. The spindle RPM, stroke rate, and stock removal rate are all indicated at the top of the screen with the appropriate legends. Below these values is a display of the wedge position. The initial and the final wedge positions are indicated by arrows or lines appropriately labeled, and as the wedge moves in the mandrel, a locator image continuously indicates the instantaneous wedge position. The length of the entire wedge travel display represents the total range of wedge travel for the tool recommended. Below the wedge position display a bar graph which displays spindle load is shown. It is contemplated to display spindle load as a percentage of the maximum allowable load for the recommended tool. As the wedge moves to its initial position, the load will be at or near zero. As the wedge moves from the initial position to the final position the load will increase and assume a larger value while honing takes place. Once the final diameter is reached, a spark-out period will take place wherein the spindle load will decrease until it again substantially reaches at or near zero. Below the spindle load display information regarding the in-process bore size, machine status, final bore size, cycle number, and cycle time is displayed. All of this information is computed by the microprocessor during honing of each part and is for the convenience of the operator and for record keeping purposes. It is conceivable that the control will have the ability to communicate with external devices such as a main frame, a microcomputer, or automated material handling devices.

At the end of the honing cycle the display returns to that shown in FIG. 23. If the bore diameter of the honed workpiece is found to deviate from the desired finished diameter, the operator may adjust final wedge position through selection of the "Tool Comp" option. This results in the display shown in FIG. 25. The operator uses the keypad displayed to enter the necessary correction and is returned to the display shown in FIG. 23.

It is apparent that the sequence of displays shown is only one embodiment of the set-up and run procedures. Other information may be solicited and more parameters calculated as necessary to achieve desired surface finish and bore geometry as required. Interaction with devices other than those listed is also contemplated and desirable.

Thus, there has been shown and described a novel computer controlled honing machine which fulfills all of the objects and advantaged sought therefor. It will be apparent to those skilled in the art, however, that many changes, modifications, variations, and other uses and applications of the present invention are possible, and all such changes, modifications, variations, and other uses and applications which do not depart from the spirit and scope of the invention are deemed to be covered by the invention which is limited only by the claims which follow.

What is claimed is:

1. Control means for establishing, setting up and monitoring the operating conditions of a machine tool as it operates on the surface of a workpiece, the machine tool having machine controls thereon the control of which is based on the entry by the machine operator of blueprint information as to the workpiece including information as to a beginning surface size, a final surface size, and the workpiece material comprising a computer operable on the blueprint information entered by the operator and look up table data for controlling the setting up and operation of the controls for said machine tool, input means operatively connected to said computer for inputting the blueprint information entered by the operator, a data storage operatively connected to said computer for storing data including look up table data, said computer using the input blueprint information and the stored look up table data to calculate the operating conditions for the machine tool including selecting the tooling to be used for the machine tool, said calculations being independent of further actions by the operator, and a computer output operatively connected to said computer and to the machine controls to set up and operate the machine controls to establish and carry out the machine tool operating conditions.

2. The control means of claim 1 wherein the machine tool is a honing machine.

3. The control means of claim 2 wherein the machine controls include means for adjusting the honing diameter and range therefor, means to establish machine operating RPM, stroking frequency and length and operating load.

4. The control means of claim 2 wherein the blueprint information includes workpiece initial and final bore size, bore length and workpiece material.

5. Means to control the operation of a machine tool having a rotatable work engaging member including means for expanding the diameter of the work engaging member, means responsive to the speed of rotation of the work engaging member and means responsive to the load thereon and to the diameter thereof comprising:

computer means including computer entry means for the entry of blueprint data as to a workpiece having a surface to be operated on by the machine tool, said computer means which includes storage means for storing look up table information and means to establish operating parameters for the machine tool based on the blueprint data entered in the entry means by a machine operator and on the look up table information stored in the computer storage means from which the computer means can calculate the operating parameters for controlling the operation of the machine tool.

6. The means to control of claim 5 wherein the machine tool is a honing machine having an expandable mandrel.

7. The means to control of claim 6 wherein the blueprint data entered into the computer entry means includes initial and final bore size to be honed, bore length and workpiece material.

8. Control means for a machine tool having a rotatable and expandable work engaging member having an axially tapered surface and a tapered wedge member engagable therewith and movable in surface-to-surface contact therewith for changing the diameter thereof, the machine tool having means to rotate the work engaging member, means to move the wedge member axially to change the diameter of the work engaging member, means responsive to the rotational speed of the work engaging member for producing a signal output in proportion thereto, and means responsive to the load on the work engaging member when the work engaging member is engaged with a work surface, the improvement comprising:

a computer for establishing the operating conditions for the machine tool including an associated computer monitor and computer information entry means where an operator can enter blueprint information as to the workpiece, said computer generating at least one set up screen on the monitor, operator actuatable means to enter into the computer entry means the blueprint information as to the workpiece including data as to initial workpiece surface diameter, final workpiece surface diameter, work surface length and workpiece material including hardness characteristics, said computer having an associated computer data storage for storing look up table data and including software and an output control connected to the machine tool for establishing the operating conditions for the machine tool based upon the blueprint information as to the workpiece data entered into the computer entry means and data stored in the computer data storage including look up table data as to rotational speed of the work engaging member and as to the position of the wedge member relative to the rotatable work engaging member.

9. The control means of claim 8 wherein the machine tool is a honing machine having a rotatable and expandable mandrel.

10. Means to control the operation of a honing machine having a mandrel with an elongated substantially tubular abrasive member having an end-to-end slit therethrough and a tapered inner surface, a tapered adjustment member positioned in the abrasive member having an outer tapered surface in surface-to-surface contact with the inner surface of the abrasive member and movable axially therein to adjust the diameter of the abrasive member, motor means to rotate the mandrel, a first sensor responsive to the speed of rotation of the mandrel, a second sensor responsive to the load on the mandrel, and a third sensor responsive to the axial position of the tapered adjustment member relative to the abrasive member, the improvement comprising a computer including computer entry means for the entry by an operator of blueprint data including data as to the initial and final conditions of a workpiece surface to be honed, said computer including a data storage device for storing look up table data and program means to establish operating parameters for the honing machine including selecting the type of mandrel to be installed on the honing machine and the maximum permissable load that can be placed on the mandrel based on the blueprint data entered in the computer entry means and the look up table data stored in the computer storage device for controlling the operation of the honing machine during a honing operation.

11. The means to control the operation of a honing machine of claim 10 wherein the computer includes means programmed to maintain the abrasive member engaged with the work surface for a predetermined time interval at the conclusion of a honing operation to relieve stresses in the workpiece and to bring the workpiece surface being honed to its final diameter and surface finish.

12. The means to control the operation of the honing machine of claim 10 wherein the computer data storage device contains look up table data including look up table data as to different types of materials to be honed.

13. The means to control the operation of a honing machine of claim 10 wherein the computer program means is programmed to determine the duration of time required to hone a workpiece.

14. The means to control the operation of the honing machine of claim 10 wherein the computer program means is programmed to establish acceptable ranges for honing diameter.

15. The means to control the operation of the honing machine of claim 10 wherein the computer storage contains look up table data as to the type of abrasives to be used.

16. The means to control the operation of a honing machine of claim 10 wherein the computer program means is programmed to establish acceptable ranges of mandrel load.

17. Control means for a honing machine having a rotatable mandrel including an expandable tubular work engaging abrasive member having an axially tapered inner surface and a tapered wedge member having a wedge surface in surface to surface contact with the inner surface of the abrasive member and movable axially in the abrasive member for changing the diameter thereof, the honing machine having means to rotate the mandrel, means to move the wedge member axially to change the diameter of the abrasive member, means responsive to the rotational speed of the mandrel for producing a signal output in proportion thereto, and means responsive to the load on the mandrel when the abrasive member is engaged with the work surface, the improvement comprising computer means for controlling the operation of the honing machine including associated computer monitor means and information entry means, said computer means generating at least one set up screen on the monitor means, means to enter into the entry means workpiece data including data as to initial work surface diameter, final work surface diameter, work surface length and workpiece material including hardness characteristics, the computer means including data storage means including software means, said computer means establishing the operating conditions for the honing machine based on the data entered into the entry means and data stored, including establishing a mandrel rotational speed and a range of movement for the wedge member, the computer means further includes means for producing a run screen on the monitor means to indicate the operating condition of the machine during a honing operation, said run screen including means to indicate the position of the tapered wedge member relative to the abrasive member and means to indicate the instantaneous load on the mandrel.

18. Control means for a honing machine having a rotatable mandrel including an expandable tubular work engaging abrasive member having an axially tapered inner surface and a tapered wedge member having a wedge surface in surface-to-surface contact with the inner surface of the abrasive member and movable axially in the abrasive member for changing the diameter thereof, the honing machine having means to rotate the mandrel, means to move the wedge member axially to change the diameter of the abrasive member, a first sensor responsive to the rotational speed of the mandrel for producing a signal output in proportion thereto, and a second sensor responsive to the load on the mandrel when the abrasive member is engaged with the work surface for producing a signal output in proportion thereto, the improvement comprising a computer for controlling the operation of the honing machine including an associated computer monitor and a computer information entry device, said computer generating at least one set up screen on the monitor means, means to enter into the computer entry device blueprint data including data as to initial work surface diameter, final work surface diameter, work surface length and workpiece material including hardness characteristics, the computer including a look up data storage for the storage of look up table data and associated software, said computer including means for establishing the operation conditions for the honing machine based on the blueprint data entered into the computer entry device and the look up data stored in the computer data storage including establishing a mandrel rotational speed and a range of movement for the wedge member.

19. The control means for a honing machine of claim 17 wherein the computer has output means operatively connected to the means to move the tapered wedge member, the means to rotate the mandrel, and the means responsive to the load on the mandrel.

20. The control means for a honing machine of claim 18 wherein the computer has program means operatively connected to the honing machine and programmed for establishing a maximum load on the mandrel and for aborting a machine operation when the mandrel load exceeds said established maximum.

21. The control means for a honing machine of claim 18 wherein the honing machine includes means operatively connected to the mandrel for producing relative axial movement between the rotatable mandrel and the work surface, said last named means including means for establishing a mandrel stroking length and a stroking frequency.

22. The control means for a honing machine of claim 18 wherein the expandable tubular work engaging abrasive member has a slot formed therethrough extending from one end to the other end.

23. The control means for a honing machine of claim 18 wherein the honing machine includes a position sensor for producing a response representative of the position of the mandrel axially relative to the work surface.

24. The control means for a honing machine of claim 18 wherein the honing machine has a load sensor responsive to the load on the mandrel.

* * * * *